Feb. 25, 1958 H. R. JOHNSON ET AL 2,824,950
ULTRASONIC COUPLING FOR WELDING ROD
Filed Nov. 22, 1955 2 Sheets-Sheet 1
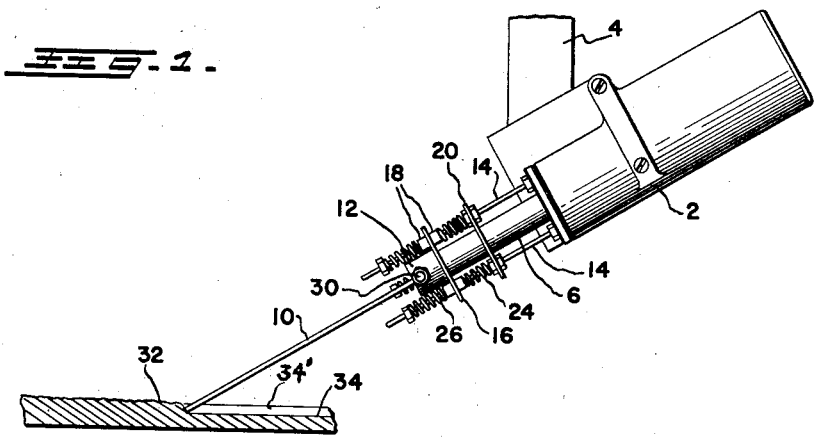
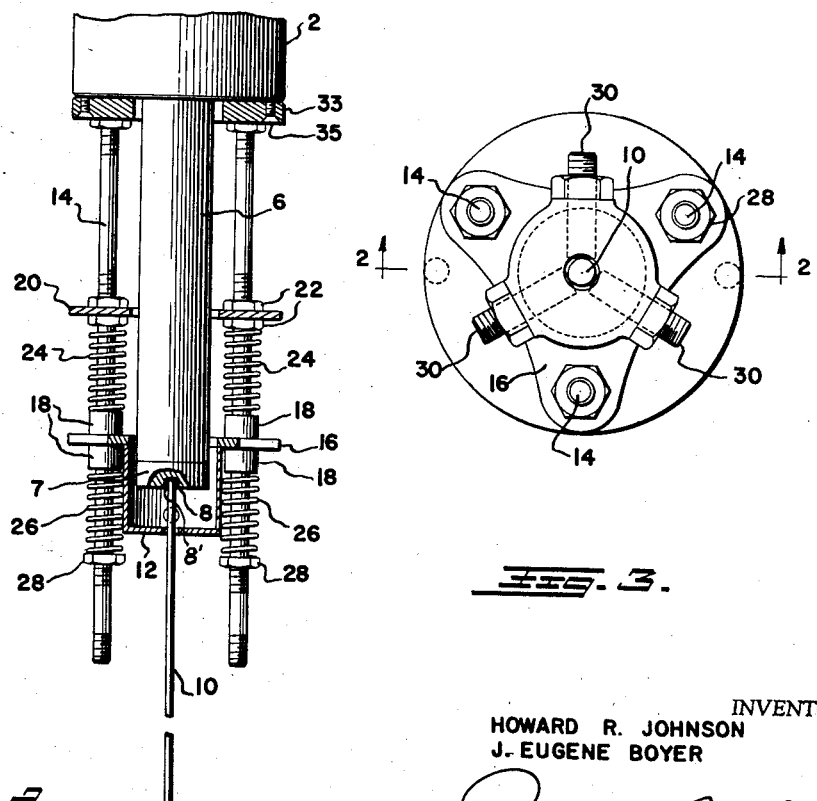
INVENTORS
HOWARD R. JOHNSON
J. EUGENE BOYER
BY
ATTORNEY

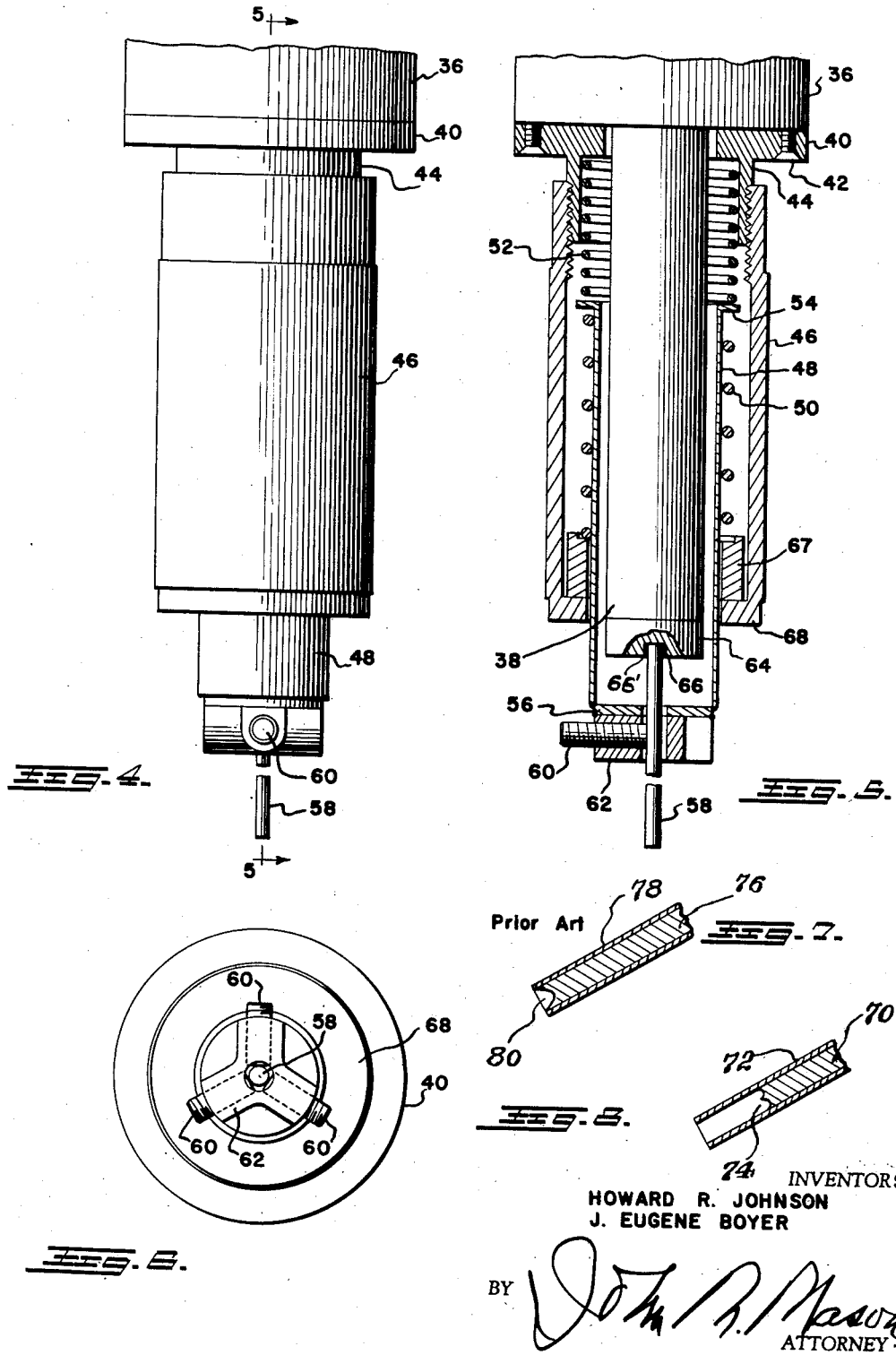

United States Patent Office 2,824,950
Patented Feb. 25, 1958

2,824,950

ULTRASONIC COUPLING FOR WELDING ROD

Howard R. Johnson, Collingswood, N. J., and Jesse Eugene Boyer, Coatesville, Pa., assignors to Lukens Steel Company, Coatesville, Pa., a corporation of Pennsylvania Application November 22, 1955, Serial No. 548,304

11 Claims. (Cl. 219—130)

This invention relates to an ultrasonic welding rod holder.

The principal object of this invention is to provide a holder which will floatingly support a welding rod.

Another object of this invention is to provide a holder which will transmit ultrasonic waves to a welding rod carried thereby.

A further object of this invention is to provide a holder which will so support a welding rod with relation to the work as to allow the operator to deposit a weld metal bead with high frequency electric and sonic waves.

Other objects will appear hereinafter throughout the specification.

Referring to the drawings:

Figure 1 shows a side elevation of one form of our improved rod holder in its relation to the work;

Figure 2 is a vertical sectional view taken on the line 2—2 of Figure 3;

Figure 3 is a bottom plan view showing the means for holding the welding rod in place in the holder;

Figure 4 is a side elevation of another form of our holder;

Figure 5 is a vertical sectional view taken on the line 5—5 of Figure 4;

Figure 6 is a bottom plan view of the holder of Figures 4 and 5;

Figure 7 is a detail view in section of the lower end of a welding rod now in common use; and Figure 8 is a detail view in section of the lower end of an improved welding rod used with our holder.

Referring to Figures 1, 2 and 3 of the drawings, 2 represents a transducer housing supported from a bracket 4 mounted on any convenient horizontally movable carriage means (not shown). This housing 2 is provided with a transducer shaft 6 which extends downwardly from the housing and is provided at its lower end with a copper shoe 7 in which is formed a socket 8 into which the upper end of the welding rod 10 fits.

In order to aid in transmitting sound energy from the copper shoe 7 to the welding rod 10, this space between the wall of the socket 8 and the rod 10 is filled with a compound 8' of high specific gravity. The joint thus formed is known as a "silicone grease seal." The term "seal" as used here is intended to mean a contact and transmission medium and not a seal of the type used to prevent leakage between two adjacent surfaces.

The welding rod 10 is detachably secured at its upper end in a cup-like member 12 floatingly held on three downwardly extending rods 14 secured at their upper ends to the housing 2. These rods are parallel to a transducer shaft 6 and are arranged therearound substantially 120° apart. A triangular plate 16 extends outwardly from the rim of the cup 12 and is provided with apertures through which the rods 14 slidably extend. This plate serves as an abutment for three pairs of "teflon" bushings 18, one pair being arranged on each rod with a bushing on each side of the plate.

A second plate 20, similar in shape to the plate 16, is rigidly secured to the rods 14 in upwardly spaced relation to the plate 16 by pairs of nuts 22 threaded on the rods, as clearly shown in Figures 1 and 2. The lower nuts on each pair serve as abutments for the upper ends of three coil springs 24, one on each rod. The lower end of each of these springs rests against one of the bushings 18. A similar set of springs 26 is arranged on the rods 14 below the lower set of bushings. These springs abut the bushings at their upper ends and nuts 28 on the bolts 14 at their lower ends. The springs are normally compressed between the bushings 18 and the nuts against which they abut, and floatingly hold the cup 12 and the welding rod 10 which is secured to the cup by the three screws 30.

The rods 14 are secured to the lower end of the transducer housing by a plate 33 and screws 35, although it will be understood that any suitable means may be used, if desired.

In Figure 1, the work on which the weld 32 is being made is shown at 34 and the weld channel in which the welding rod travels at 34'.

Referring now to Figures 4, 5 and 6, 36 represents the transducer housing, and 38 the transducer shaft, these elements being similar in structure to those shown in Figures 1 and 2. In this form, a plate 40 is secured to the lower end of the housing 38 by screws 42 and is provided with a depending exteriorly threaded sleeve 44 onto which an interiorly threaded sleeve 46 is screwed. These sleeves serve to house the upper portion of a third sleeve 48 which is floatingly held between the springs 50 and 52. The upper end of the sleeve 48 has an outwardly extending annular flange 54 which is positioned to abut the lower end of the sleeve portion 44 and thus limit upward movement of the sleeve 48.

The lower end of the sleeve 48 is closed by a plate 56 secured thereto and provided with an aperture to receive the welding rod 58 which is rigidly held in place by three screws 60 mounted in a plate 62 secured to the lower sides of the plate 56. As in the form of Figures 1, 2 and 3, the lower end of the transducer shaft 38 is provided with a copper shoe 64 having a socket 66 to receive the upper end of the welding rod and a silicone grease seal 66'.

The sleeve 48 is floatingly held in position by means of two coil springs 50 and 52, the spring 52 being confined between the plate 40 and one side of the flange 54 on the sleeve 48, while the spring 50 is confined between the opposite side of the flange 54 and a collar 67 encircling the sleeve 48 and bearing against the inwardly extending annular flange 68 on the lower end of the sleeve 46.

The welding rod shown in Figure 8 indicates the nickel drag electrode used in this invention and comprises the inner metallic portion or wire 70 which is melted to form the weld material, and the outer flux coating 72 which is not as good a heat conductor as the weld material 70 and is extruded on the surface of the wire. As clearly shown in this form of rod, the cup 74 formed in the end of the rod as the molten metal is deposited is much deeper than those formed in the rods now in common use, which indicates that the molten metal is removed as it is formed and does not form large drops which are removed one by one by gravity. Experience has shown that when large drops accumulate direct shorts occur, thereby interrupting the welding cycle, which creates an uneven deposit and has a tendency to make the weld porous.

In the welding rod shown in Figure 7, which represents a prior art form, the weld metal is shown at 76 and the flux coating at 78. It will be noted that the cup 80 thus formed is extremely shallow as compared to the form of Figure 8.

In the operation of the present invention, the holder is moved in a horizontal path in spaced relation to the work to be welded and carries a nickel drag welding rod which touches the work and is dragged along over it at an angle of about thirty degrees to the surface of the work. As the holder moves over the work and along the weld channel 34', it is subjected to ultrasonic vibrations or waves from a transducer mounted in the transducer housing at a rate of about 20,000 vibrations per second. These vibrations cause a decided improvement in the weld being made in that no gas or flux is entrapped in the metal, thereby producing a weld without porosity and with great strength and corrosion resistance, due to a much finer grain. By the use of the improved holder with a nickel drag welding rod, it has been found that there was a reduction of about 200% in grain refinement. It was also found that nickel drag electrodes would stick when sound vibrations were not used but would not when they were used. As shown in Figure 7, the cavity in the lower end of the rod is near the end of the electrode and rounded into more or less of a cone shape when no sound is used, while, when sound is used, the cavity is spaced an appreciable distance from the end of the electrode and has a pointed projection extending downwardly from its central portion, as shown in Figure 8. In the case where sound vibrations or waves are used, the metal is removed as rapidly as it is melted and is applied more evenly with less spatter.

The spring arrangements of our improved holders serve to hold the rod yieldingly in position on the work and against the transducer shaft through which the ultrasonic vibrations are transmitted to the rod.

The means used to supply electrical current to the holder has not been shown, but it will be understood that any suitable means, such as electric cables, may be used.

The above description and drawings disclose two embodiments of the invention, and specific language has been employed in describing the figures. It will, nevertheless, be understood that no limitations of the scope of the invention are thereby contemplated, and that various alterations and modifications may be made as would occur to one skilled in the art to which the invention relates.

We claim:

1. A welding rod holder comprising a transducer housing, a transducer shaft projecting from said housing, said shaft being adapted to transmit ultrasonic vibrations to a welding rod carried by said holder, an axially movable member enclosing the outer end of said shaft and having its end wall spaced therefrom, means mounting said member on said transducer housing independent of said shaft comprising a spaced stationary abutment means carried by said housing and arranged around said shaft, a flange extending laterally from said member and positioned between said stationary abutment means, a spring means mounted between one stationary abutment means and one side of said flange, a second spring means mounted between the other stationary abutment means and the other side of said flange, said spring means being mounted around said shaft, and means carried by said member for securing a welding rod to said member.

2. A welding rod holder as in claim 1, wherein each of said spring means comprises coil springs.

3. A welding rod holder as in claim 1, wherein said means for securing said welding rod in said member comprises a plurality of screws arranged radially with respect to said member.

4. A welding rod holder as in claim 1, wherein the spring means are carried on rods secured to the transducer housing and arranged in parallel relation to the transducer shaft.

5. A welding rod holder as in claim 1, wherein a sleeve member is secured to said housing and extends outwardly therefrom, a second sleeve member detachably secured to the outer end of said first-mentioned sleeve member, said sleeve members enclosing said two spring means.

6. A welding rod holder as in claim 1, wherein each of the spring means comprises a pair of coil springs arranged around said transducer shaft.

7. A welding rod holder as in claim 1, wherein the outer end of said transducer shaft is provided with a socket into which the end of a welding rod is received.

8. A welding rod holder as in claim 1, wherein said abutment means are adjustable to vary the force of said spring means.

9. A welding rod holder as in claim 4, wherein each of the spring means comprises a pair of coil springs on each of said rods, one on each side of said flange, and a bushing between each spring and said flange.

10. A welding rod holder as in claim 4, wherein said flange is provided with apertures to slidably receive said rods.

11. A welding rod holder as in claim 4, wherein one of said abutment means comprises a ring surrounding said shaft and provided with apertures to receive said rods.

References Cited in the file of this patent

UNITED STATES PATENTS

| | | |
|---|---|---|
| 1,984,809 | Requa | Dec. 18, 1934 |
| 2,224,821 | Humphrey | Dec. 10, 1940 |
| 2,228,867 | Borstel | Jan. 14, 1941 |
| 2,490,593 | Kay | Dec. 6, 1949 |
| 2,526,035 | Miller | Oct. 17, 1950 |